United States Patent [19]
Craig

[11] Patent Number: 5,666,890
[45] Date of Patent: Sep. 16, 1997

[54] BIOMASS GASIFICATION SYSTEM AND METHOD

[76] Inventor: Joe D. Craig, P.O. Box 70, Tahoka, Tex. 79373

[21] Appl. No.: 477,356

[22] Filed: Jun. 7, 1995

Related U.S. Application Data

[63] Continuation-in-part of Ser. No. 264,010, Jun. 22, 1994, abandoned.

[51] Int. Cl.$^6$ .................................................. F23G 5/12
[52] U.S. Cl. ........................ 110/229; 110/218; 110/235; 60/39.29
[58] Field of Search ............................ 110/229, 245, 110/263, 346; 122/7 R, 4 D, 2

[56] References Cited

U.S. PATENT DOCUMENTS

| | | | |
|---|---|---|---|
| 2,856,273 | 11/1958 | Beber et al. | 422/145 |
| 2,941,862 | 6/1960 | Cyr et al. | 423/110 |
| 2,959,537 | 11/1960 | Welty, Jr. | 208/164 |
| 3,002,805 | 10/1961 | Browning, Jr. et al. | 208/135 |
| 3,098,458 | 7/1963 | Lantz, Jr. | 110/242 |
| 3,362,887 | 1/1968 | Rodgers | 201/2.5 |
| 3,571,946 | 3/1971 | Karweil et al. | 34/591 |
| 3,767,756 | 10/1973 | Blades | 264/184 |
| 3,863,577 | 2/1975 | Steever et al. | 110/245 |
| 4,022,820 | 5/1977 | Johnson | 528/502 F |
| 4,041,906 | 8/1977 | Edwards | 122/2 |
| 4,095,958 | 6/1978 | Caughey | 48/111 |
| 4,203,689 | 5/1980 | Kraxner et al. | 406/123 |
| 4,285,193 | 8/1981 | Shaw et al. | 60/39.06 |
| 4,308,034 | 12/1981 | Hoang | 48/111 |
| 4,308,374 | 12/1981 | Volbracht et al. | 528/336 |
| 4,334,484 | 6/1982 | Payne et al. | 110/210 |
| 4,378,240 | 3/1983 | Siegle et al. | 75/348 |
| 4,427,053 | 1/1984 | Klaren | 165/104.16 |
| 4,470,358 | 9/1984 | Prochnow | 110/229 |
| 4,530,700 | 7/1985 | Sawyer et al. | 44/606 |
| 4,592,762 | 6/1986 | Babu et al. | 48/197 R |
| 4,599,953 | 7/1986 | Gould | 110/234 |
| 4,638,629 | 1/1987 | Archer et al. | 60/39.05 |
| 4,699,632 | 10/1987 | Babu et al. | 48/197 |
| 4,702,073 | 10/1987 | Melconian | 60/39.464 |
| 4,732,092 | 3/1988 | Gould | 110/229 |

(List continued on next page.)

OTHER PUBLICATIONS

R. M. Pierce, "Advanced Combustion Systems for Stationary Gas Turbine Engines", Pratt and Whitney Aircraft Group, Jan. 1980, pp. 1–31, 84–87.
Paskin et al., "Composite Matrix Cooling Scheme for Small Gas Turbine Combustors", AIAA/SAE/ASME/ASEE 26th Joint Propulsion Conference, Jul. 1990, pp. 1–10.
Sixto, "Nitrogen Oxides Reduction By Staged Combustion Of LCV Gas", Aug. 1990, pp. 11–21, 55–67,81.
"The New Generation of Biomass Power Plant", Advertisement of Bioflow Ltd, date unknown, pp. 1–3.
"Westinghouse: Focusing Our Energy On The Future", Advertisement of Westinghouse, date unknown, pp. 1–3.
"Integrated turbine system has worldwide potential", Bio Tech Brief, Feb. 1994, pp. 1–2.
"POWERlines—News For Tampella Power's Customers", Summer 1993, pp. 2–15.

*Primary Examiner*—Henry A. Bennett
*Assistant Examiner*—Pamela A. O'Connor
*Attorney, Agent, or Firm*—Novak Druce

[57] ABSTRACT

A gasification system for biomass fuel. The system includes a bulk biomass feeder in which biomass fuel is stored and from which biomass fuel is supplied to the system. A pneumatic conveyor system is employed that transports the biomass fuel from the feeder to a high pressure feed tank. Once deposited in the feeder, the pressure on the fuel is raised and maintained throughout the balance of the gasification process. From the feeder, the fuel travels on a variable speed pressurized conveyance and is dispensed in a controlled and regulated manner to the reactor vessel that takes the form of a fluidized bed reactor. The fuel is gasified in the reactor and the resulting gas and ash mixture is separated. At a cyclone, most of the suspended ash is removed from the mixture. After the cyclone, the gas may be is further filtered before transmission to an end use. The system may optionally be automated by computer control.

27 Claims, 6 Drawing Sheets

U.S. PATENT DOCUMENTS

| | | | |
|---|---|---|---|
| 4,787,208 | 11/1988 | DeCorso | 60/723 |
| 4,819,438 | 4/1989 | Schultz | 60/730 |
| 4,838,030 | 6/1989 | Cramer | 60/753 |
| 4,848,249 | 7/1989 | LePori et al. | 110/234 |
| 4,912,931 | 4/1990 | Joshi et al. | 60/732 |
| 4,928,481 | 5/1990 | Joshi et al. | 60/737 |
| 4,968,325 | 11/1990 | Black et al. | 48/76 |
| 5,025,622 | 6/1991 | Melconian | 60/39.464 |
| 5,072,675 | 12/1991 | Fowler | 110/346 |
| 5,184,455 | 2/1993 | Ewing et al. | 60/39.02 |
| 5,207,053 | 5/1993 | Spadaccini et al. | 60/39.02 |
| 5,255,506 | 10/1993 | Wikes et al. | 60/39.12 |
| 5,279,234 | 1/1994 | Bender et al. | 110/210 |
| 5,290,327 | 3/1994 | Rossle | 48/111 |

BIOMASS GASIFICATION SYSTEM AND METHOD

BACKGROUND OF THE INVENTION

This application is a continuation-in-part of the U.S. application having Ser. No. 08/264,010 filed Jun. 22, 1994, now abandoned and entitled Biomass Fuel Turbine Combustor.

1. Field of the Invention

This invention relates to gasification systems, and more particularly to systems for gasifying biomass thereby producing useable combustible gas.

2. Background of the Invention

In this day and time, alternative fuel sources are continually being investigated. One of the greatest sources of fuel is also readily renewable; it is biomass generated by both plants and animals. Many activities produce waste biomass as a by-product that must be dealt with, usually at an added expense to the primary operation. This is particularly true in agricultural businesses and others such as timber production. One particularly applicable example is cotton harvesting. A heretofore relatively useless biomass by-product results from the growing and ginning of cotton. It is commonly referred to as cotton gin trash and would have previously been returned to the land to serve as compost or discarded as refuse. It is possible that the biomass could be burned as a fuel, but the usefulness of the energy produced would be quite limited.

At many of the locations at which biomass would be abundant as an alternative fuel, there are also conventional energy needs such as commercial and residential electricity usage. As mentioned previously, an example would be a cotton gin that produces an ample supply of biomass as a by-product of the ginning process and the gins and surrounding areas also require electrical power. Still further, the gins are located in agricultural areas that may be remote to conventional electrical power suppliers. Therefore, an independent source of electrical power would be desirable. Prior to the present invention, however, power generating plants having an appropriate capacity and capability to burn the abundant biomass fuel have not been available. Conventionally designed power plants must be built on a large scale to be economically feasible. Furthermore, these conventional designs do not accept all kinds of biomass.

In view of these comments, the need for a relatively small scale and efficient means for converting otherwise marginally productive biomass into a useful fuel has been recognized.

SUMMARY OF THE INVENTION

This invention satisfies the recognized need for a relatively small scale and efficient means for converting biomass into a useful fuel. More particularly, it provides a commercially viable apparatus and method for producing combustible gas from biomass fuel that can be used among other applications, to power an electricity generating gas turbine. Still further, one of the waste by-products of the gasification process is char-ash which has potential use as activated carbon.

The full system of which the gasification system is a component is referred to as a Biomass-fueled Integrated Gasifier Gas Turbine (BIGGT). In addition to the benefits previously discussed, the biomass fuel source is clean, renewable, environmentally compatible and often readily available. The environmentally compatible characteristics of biomass may be contrasted with oil and natural gas which are considered pollutants when released into the environment. Biomass gasification has other advantages over most fossil fuels. In the instance of coal, much higher temperatures and volumes of supplied oxygen are required for combustion because of its high carbon content; coal is approximately three-quarters fixed carbons and one-quarter volatiles. In contrast, biomass is approximately three-quarters volatiles and one-quarter fixed carbon.

Gas and power production by the systems disclosed herein and in the application from which this is a continuation-in-part is continuous; therefore, the disclosure of commonly owned U.S. Patent Application having Ser. No. 08/264,010 and filing date Jun. 22, 1994 is expressly incorporated herein by reference. Furthermore, the resulting by-products are carbon dioxide neutral and sulfur compound emissions are negligible. The bulk of the biomass that may have otherwise required disposal as waste is volumetrically greatly reduced. In fact, as previously mentioned, the by-product, char-ash is useful as activated carbon.

One embodiment of the present invention is a biomass gasification system for producing combustible gas from biomass. The gasification system includes a bulk biomass feeder for conveying biomass fuel to the gasification system from a storage location. The biomass is delivered to a high pressure feed tank and into which the biomass fuel is deposited. After the biomass fuel is deposited, the high pressure feed tank is closed and the internal pressure is raised to a processing pressure required for continued processing within the system. Downstream from the feed tank is a reactor that converts the biomass fuel into combustible gas and solids. The biomass fuel is transported to the reactor in a pressurized conveyance from the high pressure feed tank at the processing pressure. There is also a separator for separating the resulting combustible gas and solids.

The biomass input assembly serves as an initial stage for the biomass gasification system. The biomass fuel is stored in at least one, and preferably two bulk biomass feeders. Each feeder has a capacity for storing about an eight hour supply of biomass fuel required by the system. In the instance of two bulk biomass feeders, each may dispense fuel individually at a rate suitable to supply the system, or the two feeders may dispense simultaneously with a combined output from the two providing a suitable supply of biomass fuel to the system. Each feeder has a means for transporting the biomass fuel out of its interior and further along the fuel supply path. Among others, it is contemplated that the transport means out of the bulk biomass feeder(s) may be a screw conveyor or live floor type conveyor.

The supply of biomass fuel delivered out of the bulk biomass feeder(s) may then be passed through a particle size reducer. Size reduction, however, will not be a required step for all biomass fuels. Some fuels will appropriately process without having the particulate size modified. In one embodiment, the particle size reducer is a hammermill that reduces the particulate size of the fuel which is then screened to assure that appropriate sizing has been achieved. In the case of using cotton gin trash material as the biomass fuel, the larger pieces of the cotton gin trash are broken down into smaller pieces in the hammermill. From the hammermill, the reduced size biomass fuel is transported upon a conveyor to an intermediate storage feeder having a capacity for approximately one hours fuel supply required by the biomass gasification system. The intermediate storage feeder has surge capabilities allowing it to supply fuel to the system both continuously at a uniform rate, or it may supply fuel at variable rates if demanded. Incorporated into the intermediate storage feeder is a final tramp material remover for ridding the fuel supply stream of undesirable material that does not lend itself to further processing by the system. Examples of such tramp material may be stones or pieces of metal that are not processible by the system.

The biomass fuel is transported from the intermediate storage feeder to the high pressure feed tank by a pneumatic conveyor connected therebetween. The pneumatic conveyor pulls an air flow therethrough of sufficient force to carry the now reduced biomass fuel in its air stream. An inlet of the pneumatic conveyor is positioned at or in the intermediate storage feeder at a location that facilitates the pick-up of biomass fuel from within the intermediate feeder. Typically, the air flow rate will be approximately twenty cubic feet per minute per pound of biomass to be carried in the air stream in a similar period of time.

In practice, the pneumatic conveyor includes a vacuum fluidly connected across the high pressure feed tank. There is a vacuum conduit fluidly connected to the high pressure feed tank at one end and terminating in a vacuum suction nozzle at an opposite end in the intermediate feeder. The exhaust from the vacuum may be passed through a vacuum cyclone to separate any solids that may have been pulled across the feed tank and into the vacuum. Within the cyclone, the solids will be "spun" out of suspension and collected at a rotary air lock. The collected biomass is then conveyed back to the biomass feeder. The now substantially solid-free vacuum exhaust is ported to the atmosphere.

The high pressure feed tank further includes at least one opening having a closure device for closing the opening substantially air-tight. The closure device is a valve. Examples of these types of closures include butterfly valves and knife gate valves. Among the openings may be included; an inlet connection, a discharge connection, and a vacuum connection. In each instance, the connection is closeable so that the tank may be a substantially gas-tight container. The feed tank further includes a compressed gas source fluidly connected to the high pressure feed tank for increasing the pressure therein when the high pressure feed tank is closed. When the gas produced from the gasification process is used in a turbine for generating electricity, compressed gas will normally be available for the generation processes. In that case, the compressed gas needed in the gasification stages may be bled from the generation stage. If the gasification processes require that the pressure be increased over that of the turbine's processes and supply, a booster may be included to raise the pressure before the gas is applied to the gasification system. When this is done, the cost of producing the compressed gas is reduced. In the illustrated embodiments, it should be appreciated that pressure delivered from a compress air source to the high pressure feed tank will be greater than pressure supplied to the reactor. The compressed gas may, however, originate from the same source, such as the turbine as herein described, and be boosted to different pressures prior to delivery.

The reactor is a gas-blown fluidized bed. It has a fluidized bed liner that serves as a container for the gas-blown fluidized bed. There is particulate, normally in the form of sand, that settles to the bottom of the fluidized bed liner when the fluidized bed is idle. A heatable gas source is fluidly connected to a distribution system that is located at the bottom of the reactor for fluidizing the particulate when gas is delivered thereto. Heated gas is initially supplied to the reactor. After an initial warm-up period, the supplied gas will no longer be heated. Instead, the reaction that has been catalyzed by the heated air becomes self sustaining and perpetuates itself as long as conducive conditions are maintained therein and fuel continues to be supplied. It is contemplated that the gas supplied to the system will be oxygen containing and may take the form of steam, or contain steam as a component thereof.

Through the use of a drop tube, the biomass is delivered directly into the radial center of the fluidized bed at any given level. Even distribution of biomass fuel is promoted by an agitator operable within the reactor's housing. The agitator is located proximate to the bottom exit end of the drop tube so that fuel delivered to the reactor is immediately dispersed throughout the fluidized bed. It is preferred that both the drop tube and agitator be constructed from silicon carbide which is durable under high-temperature and highly abrasive conditions. Additionally, a shaft constructed from partially stabilized zirconia has been employed between the agitator and its driving motor. Zirconia is preferred because of its strength and superior insulative qualities. Its use prevents the high temperatures under which the agitator operates from being transferred to the driving motor, and potentially damaging the same.

The pressurized conveyance for transporting the biomass fuel from the high pressure feed tank to the reactor at the processing pressure may alternatively include, or be combined therewith, a variable speed screw conveyor, a variable speed weigh belt, and/or a live bottom volumetric conveyor.

The separator for separating the combustible gas from the solids may alternatively include, or in combination, a cyclone separator and/or mechanical filter. External to the separators is an ash cooler for cooling heated ash that is collected from the cyclone and the filter. There may also be an ash storage container for retaining ash removed from the gasification system.

A unique quality of the present invention is that the high pressure feed tank, the conveyor from the feed tank to the reactor, the reactor, and the separator devices are all in fluid communication and operate under a similar raised pressure dictated by the requirements of the reactor.

Optionally, there may be included in the gasification system a controller that automates the processes of the gasification system and monitors operating conditions therein.

The present invention also comprises the method by which biomass may be processed through the above described system. The method includes depositing biomass fuel into a high pressure feed tank and then increasing the pressure therein to a processing pressure required within the gasification system for proper feeding to the reactor. The biomass fuel is conveyed under pressure from the high pressure feed tank by a variable speed conveyance assembly and deposited into a gas-blown fluidized bed reactor. The biomass is gasified in the reactor thereby producing combustible gas from the biomass. Downstream from the reactor, ash particulate is separated from the produced gas by cycloning and/or mechanical filtering.

This invention includes several components that have been individually selected for their combined benefits into a system that delivers superior performance as a biomass gasification system. Several of the components have been modified to increase their performance and/or compatibility with the system and may be optimally mated with the others for superior collective effectiveness.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefor, specific structural and functional details disclosed herein are not to be interpreted as limiting, but merely as a basis for the claims and as a representative basis for teaching one skilled in the art to variously employ the present invention.

Certain terminology will be used in the following description for convenience and reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the structure being referred to. This terminology will include these words, specifically mentioned derivatives thereof, and words of similar import.

Figure 1:
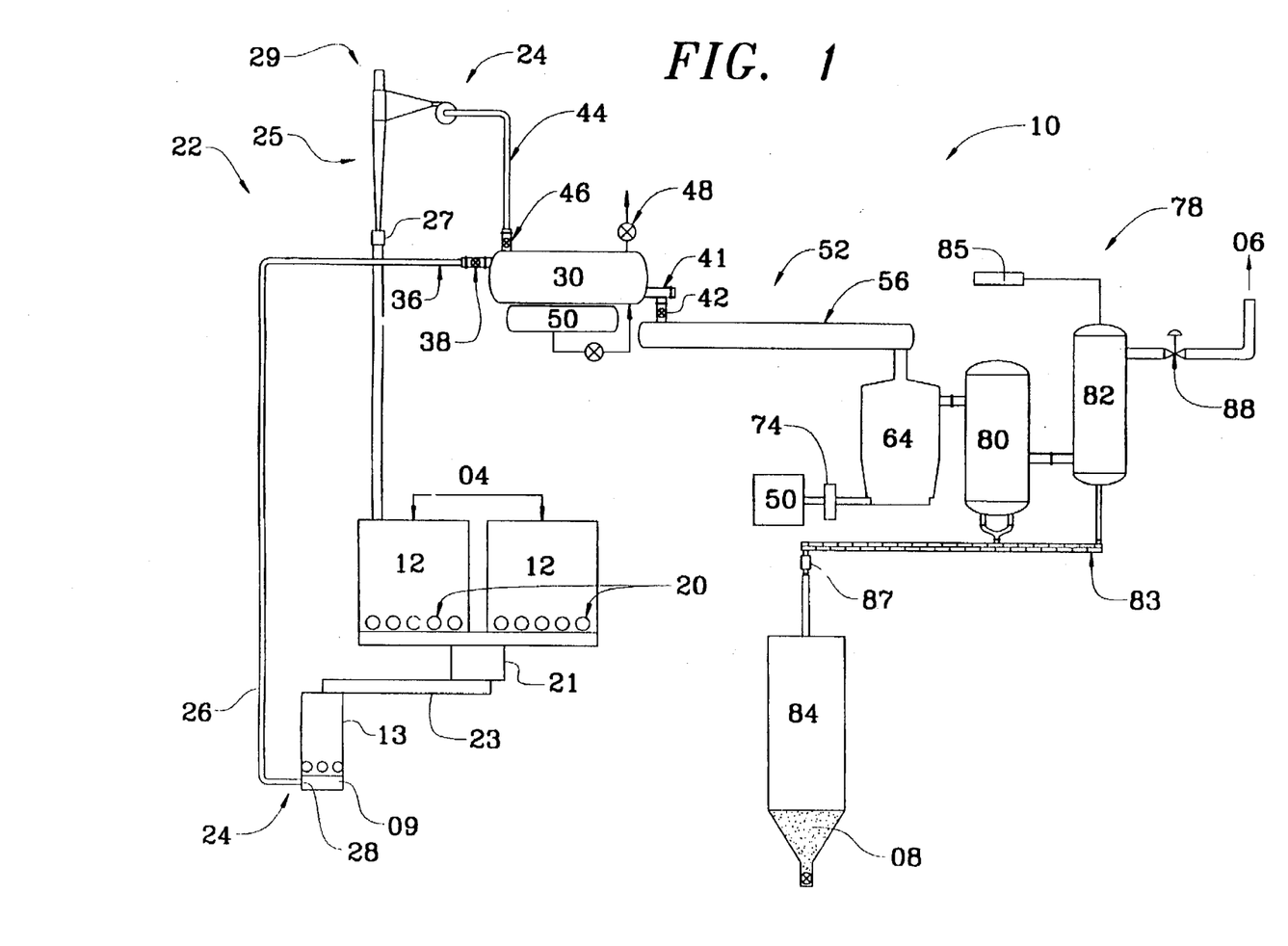
FIG. 1 is a schematic illustration of the biomass gasification system in which a variable speed weigh belt is employed to transport biomass to the reactor.
Figure 9:
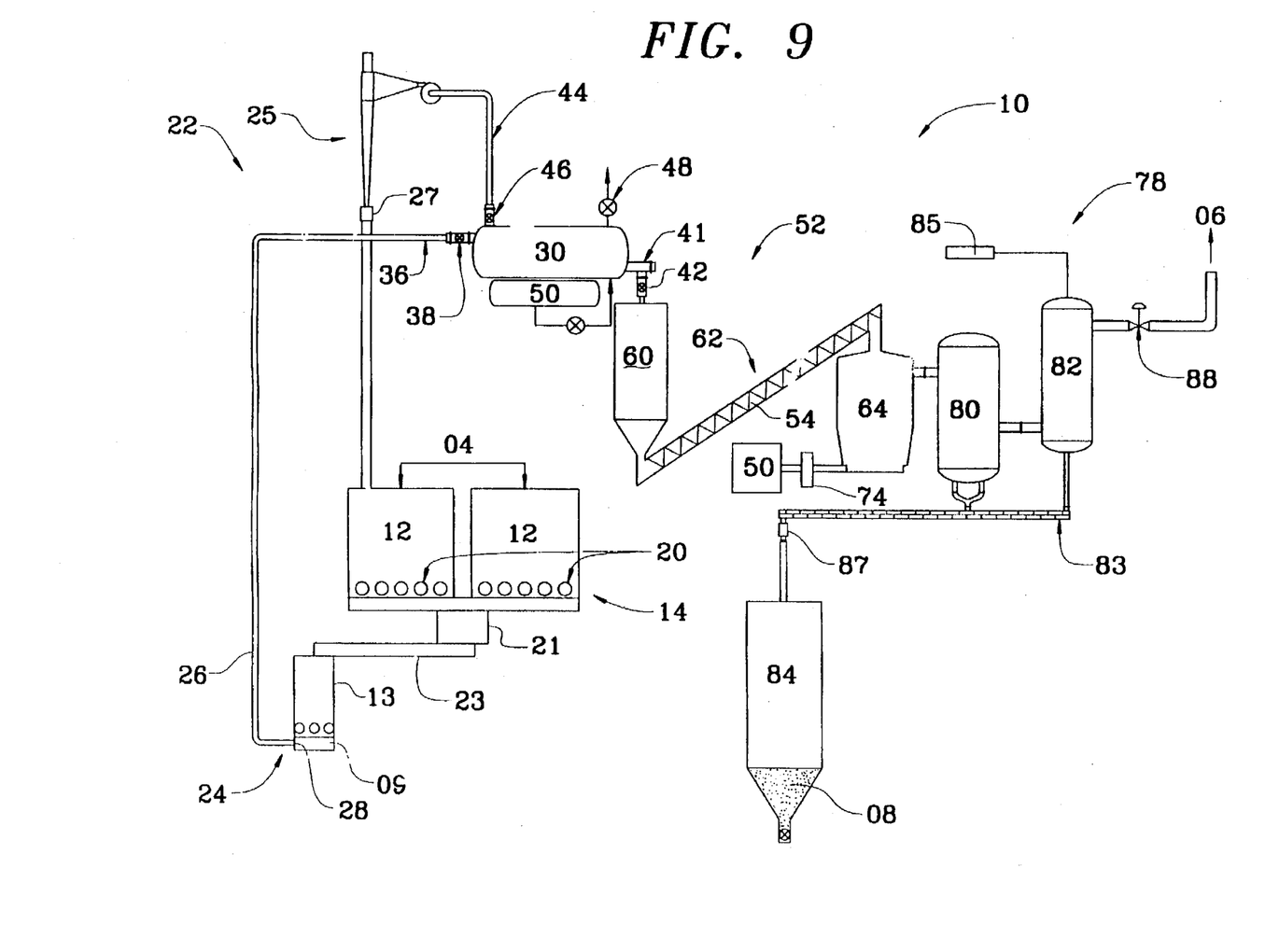
FIG. 9 is a schematic illustration of the biomass gasification system in which a meter hopper is employed to transport biomass to the reactor.

The two embodiments of the invention shown in FIGS. 1 and 9 utilize different means for metering out and transporting biomass fuel 04 to a reactor 64. The embodiment of FIG. 1 includes a weigh belt 56 as the pressurized conveyance 54, while the embodiment of FIG. 9 utilizes a meter hopper 60. Therefore, when reference is made to embodiments of the invention including a weigh belt 56, refer to the illustration of FIG. 1 and when reference is made to embodiments including a meter hopper 60, refer to the illustration of FIG. 9.

Referring to FIG. 1, a biomass gasification system 10 is illustrated. The gasification process begins by introducing biomass fuel 04 into a bulk biomass feeder 12. The feeder 12 has a live bottom 20 embodied in conveyor 14 that preferably takes the form of screw conveyors or walking floors. As described hereinabove, the live bottom 20 of the feeder 12 transports fuel 04 from the bulk biomass feeder(s) 12 to a fuel particle size reducer 21. In one embodiment, the size reducer 21 takes the form of a hammermill. From the hammermill 21, the fuel 04 is transported on a conveyor 23 to an intermediate storage feeder 13. While the bulk biomass feeders 12 are larger and have comparably long term supply capabilities on the order of eight hours of system operation, the intermediate storage feeder 13 has much less volumetric capacity. The intermediate storage feeder 13 has a storage capacity for an amount of fuel typically required for about one hour of operation of the system 10. The intermediate storage feeder 13 does, however, have surge capabilities making it possible for the rate of fuel 04 being supplied from the bulk biomass feeder(s) 12 to be varied. The intermediate feeder 13, like the bulk feeder 12, has a live floor that is controlled to deliver biomass fuel 04 to a pick-up of a pneumatic conveyor 22 at a prescribed rate that matches the pneumatic conveyor's 22 capacity. From the intermediate storage feeder 13, fuel 04 is transported by vacuum air flow to a high pressure feed tank 30.

From the high pressure feed tank 30, the fuel material 04 is transported to a meter hopper 60 from which the fuel material 04 may be precisely dispensed. The meter hopper 60 dispenses the fuel 04 into a reactor vessel 64 in which the fuel 04 is gasified and converted into combustible gas 06 and inert solids 08. The processes that take place in the reactor vessel 64 occur under pressure. Therefore it is necessary that the fuel material 04 be delivered to the reactor 64 under the requisite pressure in a substantially continuous stream. It is expected that the processing pressure may range as high as, and possibly exceed 300 psi in the instance where a gas turbine engine is the end user of the gas 06 produced by the system 10. The processing temperature within the reactor 64 normally ranges from about 650 to 850 degrees celsius. The processing pressure for the system 10 is controlled by a back pressure valve 88.

The biomass fuel 04 is originally at atmospheric pressure when contained in the bulk biomass feeder 12. The condition of the fuel 04 is not strictly regulated at this stage of the process with respect to moisture content, purity or the like. In fact, it is anticipated that biomass fuel 04 such as ginned cotton trash may be directly utilized in the system 10 without further pre-processing. In one particular example, the cotton gin trash has been stored outdoors near the processing area and loaded into the biomass feeder 12 at appropriate intervals to assure that fuel 04 is available upon demand by the system 10. The continuous conveyor 14 of the bulk biomass feeder 12 is used to transport the fuel 04. A distal end of the conveyor 14 is located proximate to a source of biomass fuel 04 and an opposite delivery end of the conveyor 14 is positioned proximate the gasification system 10. While ginned cotton trash has been used herein for illustrative purposes, it is contemplated that any biomass of sufficient quality would be suitable. More specifically, other suitable biomass sources include bagasse, cotton seed hulls, grass clippings, rice hulls, wood chips, wood waste, nut shells and the like.

As previously described, the biomass feeder 12 preferably includes a conveyor assembly comprising a live floor 20 taking the form of a screw conveyor or walking floor. If the fuel 04 is in too large of pieces or it is too tightly compacted in the bulk feeder 12, it will not process as well as when the particles of biomass were comparatively small and thoroughly loosened. Therefore, the supply of biomass fuel 04 delivered out of the bulk biomass feeder(s) 12 may then be passed through a particle size reducer 21. In one embodiment, the particle size reducer 21 is a hammermill that reduces the particulate size of the fuel 04 which is then screened to assure that appropriate sizing has been achieved. In the embodiment described herein in which cotton gin trash material is used as biomass fuel 04, the larger pieces of the cotton gin trash are broken down into smaller pieces in the hammermill. In other cases, devices known as "lump busters" may be used to loosen the biomass particles in the event they have become compacted; this is especially true when the fuel 04 is damp. The lump buster may take the form of a shaft having fingers projecting generally radially therefrom. When the shaft is rotated, the fingers engage and loosen the biomass particles in preparation for continued travel through the system 10. The lump buster may be located within the feeder 12 or it may be located at an exit port of the feeder 12 so that all biomass delivered from the feeder 12 is broken up if compacted.

From the particle size reducer 21, the biomass fuel 04 is transported upon a continuous conveyor 23 to an intermediate storage feeder 13 having a capacity for approximately one hours fuel supply required by the biomass gasification system 10. The intermediate storage feeder 13 has surge capabilities allowing it to supply fuel 04 to the system 10 both continuously at a uniform rate, or it may supply fuel 04 at variable rates if demanded. Incorporated into the intermediate storage feeder 13 is a final tramp material remover 09 for ridding the fuel 04 supply stream of undesirable material that does not lend itself to further processing by the system 10. Examples of such tramp material include stones and metal that will not process through the gasification system 10. In the case of material having greater density than the cotton gin trash 04, a gravity fall out box may be provided through which the stream of air being pulled by the vacuum 24 is passed. Within the box, the velocity of the stream will be sufficiently slowed to cause the denser objects such as stones and metal pieces to fall out of suspension. The cotton gin trash 04, however, continues downstream in suspension toward the high pressure feed tank 30. As an alternative, a magnetic field may be induced across the vacuum stream to pull metal therefrom. It is contemplated that any means for removing such tramp material would be applicable.

The biomass fuel 04 is transported from the intermediate storage feeder 13 to the high pressure feed tank 30 by the pneumatic conveyor 22 connected therebetween. The pneumatic conveyor 22 pulls an air flow therethrough of sufficient force to carry the biomass fuel 04 in its air stream. An inlet or nozzle 28 of the pneumatic conveyor 22 is positioned at or in the intermediate storage feeder 13 at a location that facilitates picking up the biomass fuel 04 from within the intermediate feeder 13.

Suction is created at the nozzle 28 by a vacuum 24 remotely located therefrom. The suction of the vacuum 24 is applied to the high pressure feed tank 30 at a vacuum connection 44 and may be controlled by a vacuum valve 46 located therebetween. Secondarily, there is an inlet connection 36 having an inlet valve 38 fluidly connected to the high pressure feed tank 30. When the vacuum's 24 suction is applied to the high pressure tank 30, the only ports into the pressure tank 30 that are open are at the inlet connection 36 and the at the vacuum connection 44. In this way, the vacuum's 24 suction is transferred through the otherwise closed high pressure tank 30 to the inlet connection 36. The inlet connection 36 is in fluid communication with a vacuum conduit 26 that terminates in the vacuum nozzle 28 that is proximately located to the fuel supplying biomass feeder 12. In the illustrated embodiment, the suction from the remotely located vacuum 24 is applied at the vacuum nozzle 28 and across the high pressure feed tank 30 thereby making it possible to pull the biomass fuel 04 from the intermediate storage feeder 13 into the high pressure tank 30 by means of the pneumatic conveyor 22.

As air is pulled through the vacuum 24 from the pressure feed tank 30, some solid material will be pulled from the tank 30 into the vacuum 24. The exhaust from the vacuum 24 is then passed through the vacuum cyclone 25 where the solids are separated from the air. The solids are collected at the bottom of the cyclone 25 and passed back to the feeder 12 through a rotary air lock 27. The air is then ported to the atmosphere through an exhaust port 29.

A third valve assembly is fluidly connected to the high pressure feed tank 30 and is referred to as the feed tank discharge valve 42 controlling a discharge connection 40. It is through the feed tank discharge valve 42 that biomass fuel 04 flows out of the feed tank 30. As described, valves are the preferred closure devices for closing the openings 32 that may be either inlets or outlets of the high pressure feed tank 30. Valves are chosen because it is desired to have the capability to open and close each opening 32 in a substantially gas-tight manner. As an example, the discharge valve is a twenty-five centimeter gate valve rated at 1033 kPa.

With all openings 32 to the high pressure feed tank 30 closed, compressed gas from a compressed gas source 50 is applied to the tank 30. At this stage, the pressure is initially raised in the system on the biomass fuel 04 in preparation for its introduction into the reactor vessel 64.

In one embodiment of the invention, the high pressure feed tank 30 is a horizontally mounted pressure vessel having a length of 305 centimeters (cm) and an internal diameter of 104 (cm). It is of standard ASME pressure vessel construction rated at 1720 kPa. The purpose of the feed tank 30 is to act as a "lockhopper" that is used to carry the biomass fuel 04 across the pressure barrier between atmospheric and the greater processing pressure of the majority of the gasification system 10. In the illustrated embodiment, the feed tank 30 has a useful volume of two cubic meters.

In practice, the high pressure feed tank 30 operates in a batch type process to elevate the pressure at which the biomass fuel 04 is introduced into the gasification system 10. In an initial configuration in which the high pressure feed tank 30 is being filled from the bulk biomass feeder 12, the discharge valve 42 is closed. The vacuum valve 46 at the vacuum connection 44 is open and a vacuum is applied to the high pressure feed tank 30. The inlet valve 38 is also open and the vacuum 24 is communicated to the vacuum suction nozzle 28. Biomass fuel 04 is pulled by the vacuum's 24 suction from the intermediate storage feeder 13, through the conduit 26 connecting the nozzle 28 to the high pressure tank 30, through the inlet valve 38 and into the confines of the high pressure feed tank 30. Collectively, this conveyance means is referred to as the pneumatic conveyor 22. The velocity of the air flow produced by the vacuum 24 at the nozzle 28 and through the conduit 26 is sufficient to pick up the biomass fuel 04 into suspension in the air flow at the intermediate storage feeder 13 and carry it to the feed tank 30. When the biomass fuel 04 reaches the increased volume of the feed tank 30, the air flow rate falls significantly and the solid biomass fuel 04 falls from suspension within the air flow and settles upon the bottom of the feed tank 30.

When the feed tank 30 has been sufficiently filled and that condition is detected by a fuel level detector 31, application of the vacuum 24 is discontinued and the vacuum valve 46 and inlet valve 38 are closed. At this stage, all openings to the pressure feed tank 30 are closed in a substantially gas-tight manner. Sufficient pressure is then applied to the tank 30 from the compressed gas source 50 to raise the interior pressure of the tank 30 to that required for equalization with the reactor vessel 64.

Figure 2:
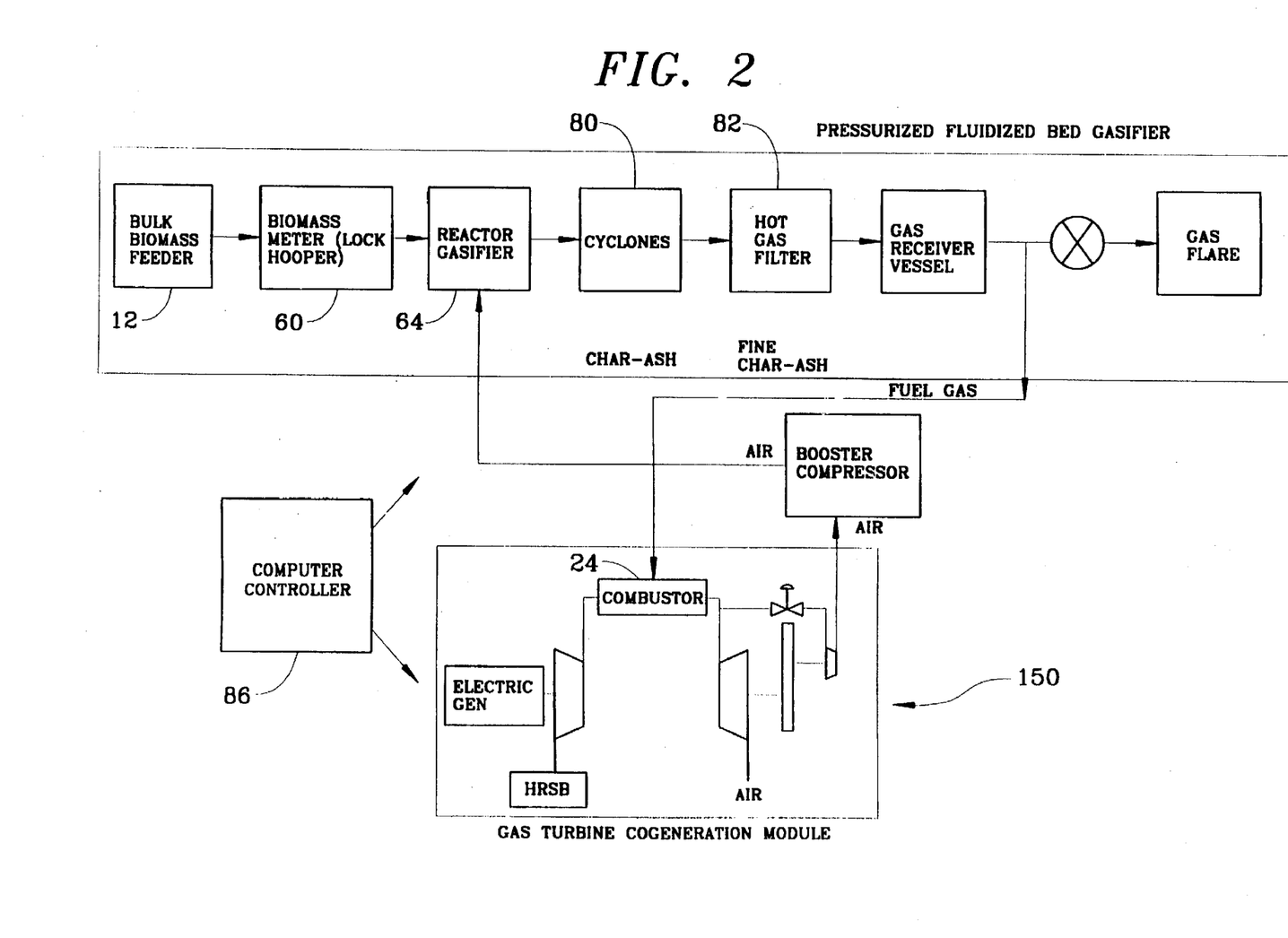
FIG. 2 is a schematic illustration of the biomass gasification system supplying a gas turbine generation module with fuel gas and the gas turbine generation module supplying compressed gas to the gasification system.
Figure 3:
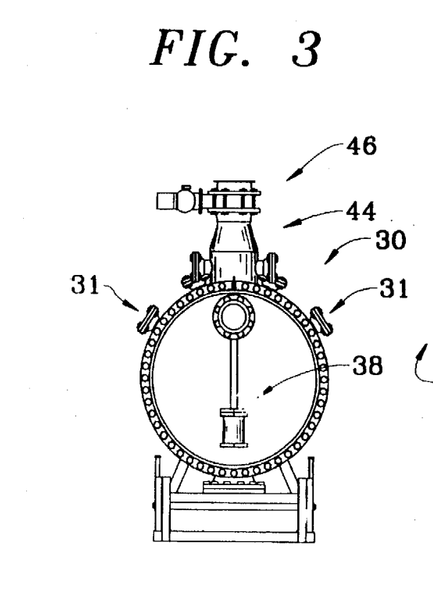
FIG. 3 is an end view of the high pressure feed tank.
Figure 4:
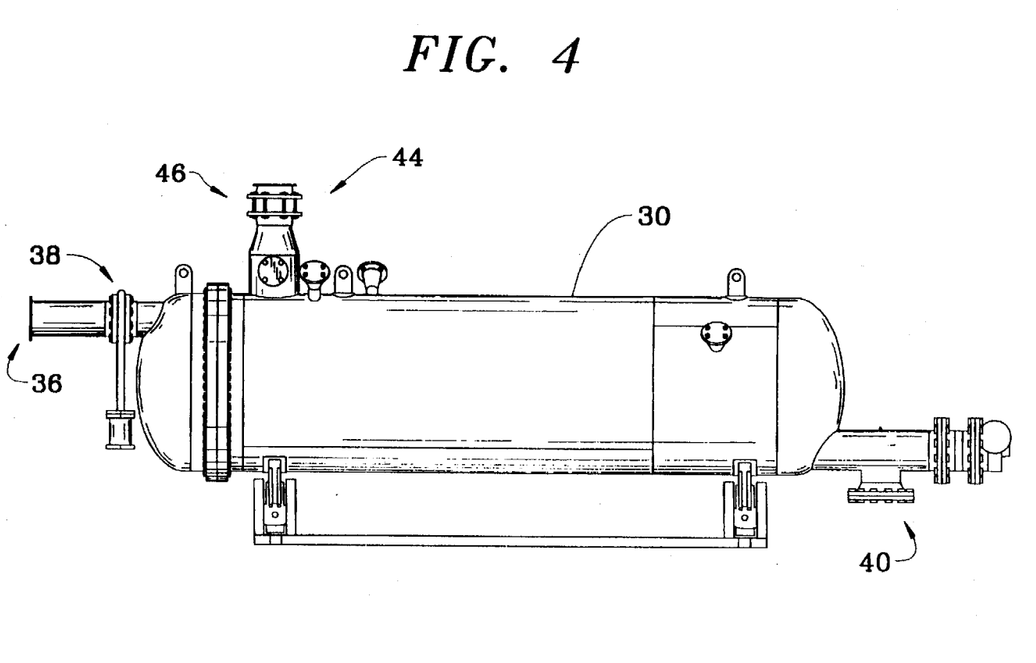
FIG. 4 is a side view of the high pressure feed tank.

In the embodiment of the present invention illustrated in FIG. 2 in which the produced gas 06 is used by a gas turbine for generating electricity, gas is compressed and maintained for the power generation process. Compressed gas from the generation module 150 may be bled off, and possible boosted, and then used in the gasification process. This is an attractive alternative to independently compressing the gas for the gasification process because it uses substantially less energy and prevents the expense of a gas compressor.

It is the reactor vessel 64 that controls and dictates the pressure required to be maintained within the system 10. Fuel 04 is dispensed from the high pressure feed tank 30 into the meter hopper 60. Once the system's 10 operating or processing pressure is achieved within the high pressure feed tank 30, the discharge valve 42 is opened and the biomass fuel 04 is transported from the pressure feed tank 30 to the meter hopper 60. It is contemplated that the discharge valve 42 may be opened upon a specific pressure being achieved and detected within the feed tank 30. Alternatively, however, because pressure equalization between the high pressure feed tank 30 and the meter hopper 60 is important, it is preferred that the discharge valve 42 be openable upon the achievement of equalization. In the illustrated embodiment, the high pressure feed tank 30 will not empty into the meter hopper 60 by gravity flow alone. A discharge screw conveyor 41, is therefore provided that transports the fuel material 04 from the high pressure feed tank 30 to the meter hopper 60. The feed tank 30 includes a unique screw conveyor system 110. As may be seen in FIGS. 5 and 6, five screw conveyors are employed: a primary screw conveyor 112, a first secondary screw conveyor 113, a second secondary screw conveyor 114, a first supplemental screw conveyor 115, and a second supplemental screw conveyor 116. Each conveyor is oriented so that a long axis about which the conveyor rotates is substantially parallel to a long axis of the pressure feed tank 30. Three of the conveyors, 112, 113, and 114 are oriented substantially parallel one to the others with respect to vertical. The primary conveyor 112 is oriented with each of the secondary conveyors 113 and 114 on either side so that it is located therebetween. The supplemental screw conveyors 115 and 116 are similarly positioned, but slightly above the others. This orientation is most clearly seen in FIG. 6 with the paired supplemental conveyors 115 and 116 parallel to one another and above the other three conveyors 112, 113, and 114. The primary conveyor 112 is configured and appropriately rotated to transport biomass fuel 04 within the pressure tank 30 toward the discharge connection 40. The secondary screw conveyors 113, 114 are configured to transport biomass fuel 04 in an opposite direction to that of the primary screw conveyor 112. The supplemental conveyors 115, 116 are configured to transport biomass in a direction similar to that of the primary conveyor 112. In this way, the biomass fuel 04 is prevented from moving within the tank 30 as a plug and potentially causing a binding condition for the conveyors. Instead, the biomass 04 is loosened by the opposing action of the conveyors 112–116, and the areas between the flights of the primary screw conveyor 112 are thereby uniformly filled to assure a relatively uniform dispensation of biomass 04 from the pressured tank 30.

Figure 5:
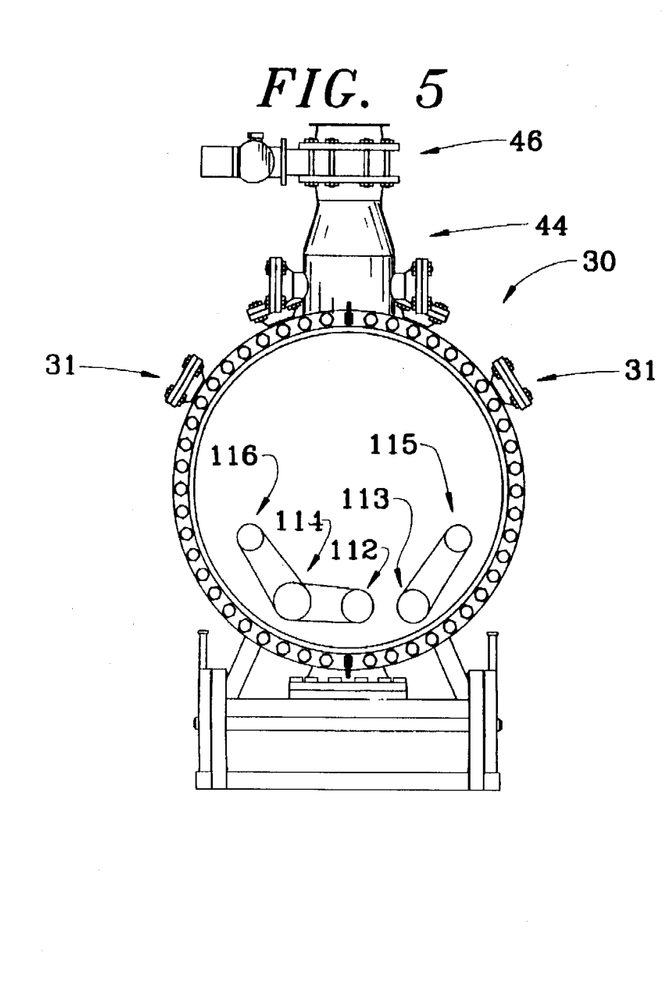
FIG. 5 is an interior end view of the high pressure feed tank in which the screw conveyors contained therein, together with the driving mechanisms for the same are illustrated.
Figure 6:
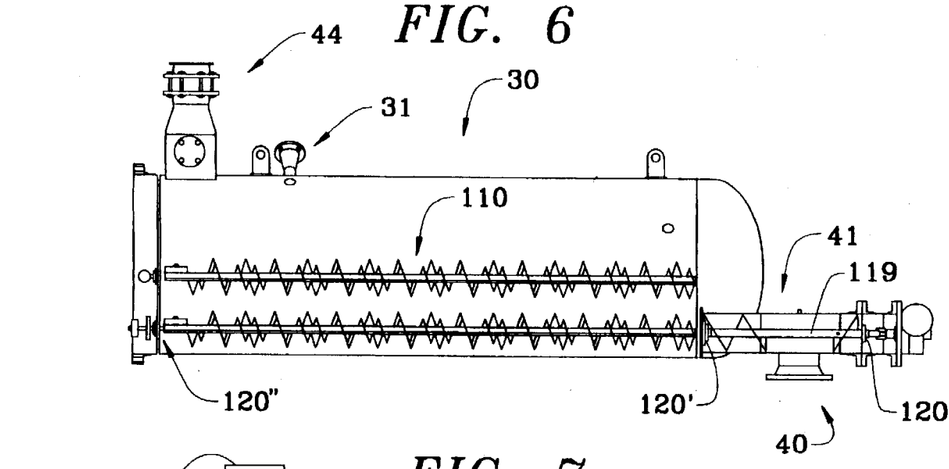
FIG. 6 is a side cut-away view of a portion of the high pressure feed tank.

Referring to FIG. 6, the primary screw conveyor 112 is powered by a drive shaft 119 supported on bearings 120, 120', and 120" at either end. Like the primary conveyor 112, the other conveyors 113–116 are similarly mounted on end bearings for rotation about their longitudinal axes within the pressure feed tank 30. Referring to FIG. 5, the first secondary conveyor 113 is located to the right of the primary conveyor 112. The two are connected by a gear so that both 112, 113 operate together. The first supplemental screw conveyor 115 is also located to the right of the primary conveyor 112, but vertically thereabove. The first supplemental conveyor 115 is belt driven off of the first secondary conveyor 113. Engagement of the first supplemental conveyor 115 is governed by a clutch located upon the first secondary conveyor 113. Engagement of the clutch is controlled by detected conditions associated with the turning characteristics of the primary 112 and first secondary conveyors 113 that initially begin to turn. During start up of the conveyors' 112, 113 initial turn cycle, the torque experienced therein will be greatest. Once it has been detected that the torque has sufficiently reduced, the first supplemental conveyor 115 will be started by engagement of the clutch on the first secondary conveyor 113. After a similar detection procedure, the second secondary conveyor 114 and the second supplemental conveyor 116 that are connected by a belt connection therebetween will be started by engaging a clutch located on the primary conveyor's 114 shaft. After rotation of all shafts has been initiated, their rotation and transport of biomass 04 will continue until terminated.

The cycle of batch filling of biomass fuel 04 into the high pressure feed tank 30 may be governed in any manner that assures that a pressurized fuel supply is always available to the pressurized conveyance 52. Therefore, it is preferred that the high pressure feed tank 30 be refilled immediately after emptying and pressured up so that it is at ready stand-by at all times except when the fuel refilling process is being executed.

In practice, detected conditions within the meter hopper 60 control the dispensation of biomass fuel 04 from the high pressure feeder tank 30 into the meter hopper 60. A designated refueling level is detectable within the meter hopper 60. When the amount of fuel present within the hopper 60 falls below that prescribed refueling level, the discharge valve 42 of the high pressure feeder tank 30 is opened and the pressurized fuel is conveyed from the high pressure feed tank 30 into the meter hopper 60, thereby refilling the hopper 60. When the biomass fuel 04 content of the meter hopper 60 has been replenished to a designated full level, the transfer of fuel 04 from the high pressure feed tank 30 to the meter hopper 60 is discontinued. The discharge valve 43 of the pressure feed tank 30 is then closed and the tank 30 is depressurized. In one embodiment, depressurization is accomplished by opening a valve specifically included for that purpose and referred to as a depressurization valve 48. It is contemplated, however, that this same function could be served by opening either or both of the other two included valves, namely the vacuum or inlet valves 46, 38. Once depressurized, the filling cycle of the feed tank 30 commences with initiation of the vacuum process.

In any event, the biomass fuel 04 is transported from the pressure feed tank 30 to the reactor 64 by the variable speed pressurized conveyance 52. The pressurized conveyance 52 is used to regulate the rate of delivery of biomass fuel 04 to the reactor 64. As previously described, the now pressurized biomass fuel 04 is fed from and by the meter hopper 60 to the reactor vessel 64. Like the feed tank 30, the meter hopper 60 is a vertical pressure vessel with a 104 centimeter interior diameter and is rated at 1720 kPa. The effective volume is 1.1 cubic meters.

The meter hopper 60 includes a live floor that may take the form of a screw conveyor or live bottom. It is this conveyor that is variably controllable with respect to the amount of fuel 04 that is delivered from the hopper 60. A conveyance assembly 62 is provided between the conveyor of the meter hopper 60 and reactor vessel 64 and is used to transport the fuel therebetween. In the preferred embodiment, the conveyance assembly 62 is a constant speed screw conveyor 54. The volumetric capacity of the conveyance 62 is greater that of the dispensing conveyance form the meter hopper 60. Therefore, any amount of fuel dispensed from the hopper 60 will be transportable to the reactor 64. Alternatively, the conveyance assembly 62 may be described as a component of the meter hopper 60 so that fuel is delivered directly form the hopper 60 to the reactor 64. This is an important stage and feature of the biomass gasification system 10 because the rate of fuel 04 delivered to the reactor 64 should be accurately regulated for proper operation of the reactor 64 and ultimately the desired production of energy for end use.

Figure 7:
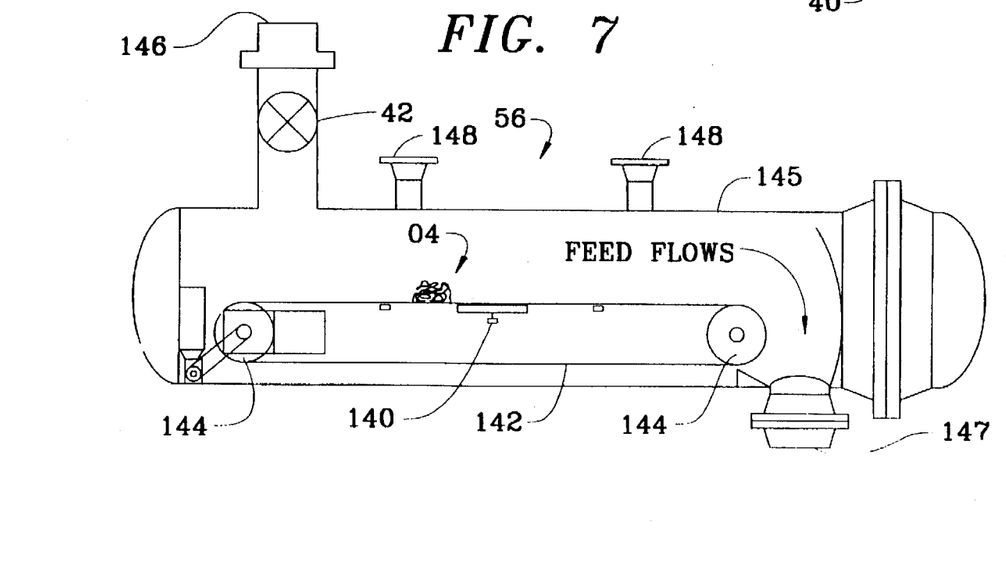
FIG. 7 is a side cut-away view of a portion of the pressurized weigh belt.

Alternatively, it is contemplated that a variable speed weigh belt type conveyance 56, as illustrated in FIG. 7, may be employed between the pressure feed tank 30 and reactor 64. The weigh belt 56 operates within a weigh belt housing 145. The weigh belt conveyance 56 is of conventional construction having a weigh belt 142 connected about two end pulleys 144. One or both of the pulleys 144 is driven providing a means for rotating the belt 142. A load cell 140 is positioned below the upper deck of the belt and upon which the biomass 04 is carried. While the left-most pulley 144 is shown as being driven, it would be preferred for this configuration to have the right-most pulley 144 to be driven since it is better to "pull" the biomass load 04 across the loadcell 140 than to push it. A biomass inlet 146 and outlet 147 are also shown.

Receptacles for optical detectors, or other types of level sensors 148 are shown to be optionally used in tandem with the loadcell 140. It is contemplated that the sensors 148 may include optical, ultra-sound, or radar detectors. Information about the level or height of the fuel 04 above the belt 142 is particularly useful when dealing with "lumpy" biomass such as cotton gin trash. When the level sensors 148 are employed, height information about the biomass fuel 04 travelling upon the belt 142 may be analyzed together with the mass information gathered by the loadcell 140. Together, this combined information can be processed and used to accurately control the rate at which fuel 04 is provided to the reactor 64.

The weigh belt 56 has the capability of measuring the mass or weight of fuel material 04 being carried by the weigh belt 56 at discrete locations upon the belt 56, or with respect to distance ranges upon the belt 56. Through the use of the weigh belt 56, the amount of biomass fuel 04 being conveyed to the reactor 64 may be accurately regulated when the fuel's 04 mass is measured upon the belt 56 and evaluated with respect to time (velocity) of conveyance. In this way the fuel's 04 mass flow rate is determined. If the constituent properties, such as moisture content of the fuel 04 are known, this method of conveyance is considered to be highly accurate.

When the weigh belt 56 is utilized as the pressurized conveyance 52, the dispensation of fuel 04 from the high pressure feed tank 30 must be altered. Where the fuel 04 had been more or less dumped or rapidly transported from the pressure feed tank 30 to the meter hopper 60 as illustrated in FIG. 9, it must now be deliverable in a controlled manner out of the feed tank 30 onto the weigh belt 56 for analysis and ultimately, delivery to the reactor 64. This more continuous delivery of fuel 04 out of the feed tank 30 prevents the previously contemplated batch filling process of the feed tank 30 when only one tank 30 is present. Therefore, at least two tanks 30 are employed in this configuration so that while one tank 30 is continuously dispensing fuel 04 to the weigh belt 56, the other(s) may be refilling. As soon as one tank 30 has expended its fuel 04 load through delivery to the weigh belt 56, another tank 30 begins dispensing so that delivery of fuel 04 to the weigh belt 56 is substantially uninterrupted.

The rate at which fuel 04 is dispensed from the feed tank 30 is controlled based on conditions detected at the weigh belt 56. It is additionally anticipated that the sensed conditions at the pressurized conveyance 52 may include information about the volume of fuel 04 present upon or in the conveyance 52. In this case, the conveyance 52 could be a live bottom volumetric conveyor.

If it is determined that more or less fuel is needed at the reactor 56, delivery to the belt 56 will be increased or decreased, respectively. Furthermore, differing amounts may be required to smooth intermittent over or under supplies of fuel 04 to the reactor 64. The important factor is that the rate of delivery from the high pressure feed tanks 30 is variable and may be controlled based on detected conditions at the weigh belt 56 or specified system demands. Together, the variable rate dispensing capabilities from the high pressure feed tank 30 and the variable speed of the weigh belt 56 are complimentary and provide a highly accurate fuel delivery system for the reactor. In practice, detected conditions at the weigh belt 56 will govern delivery of fuel 04 from the pressure feed tank 30 to the belt 56. Similarly, those same detected conditions will govern the rate of operation of the weigh belt 56 itself so that variations in delivery from the feed tank 30 may be compensated for by either slowing the belt's 56 operation down, or speeding it up.

Figure 8:
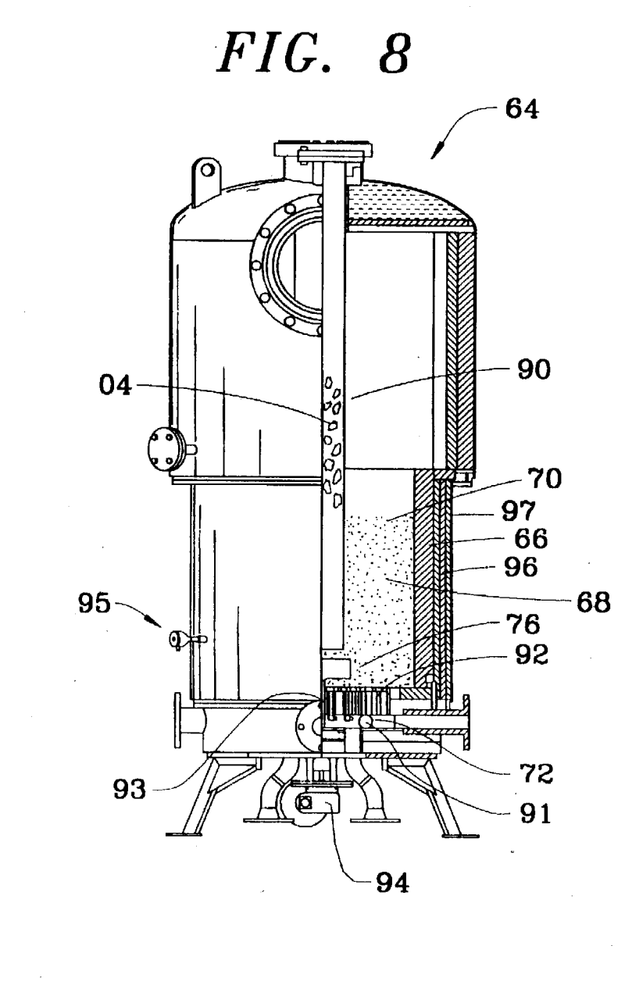
FIG. 8 is a perspective view, shown in partial cut-away, of a fluidized bed.

Referring to FIG. 8, the reactor 64 is a gas-blown fluidized bed reactor 68. The fluidized beds 68 can be characterized as a sand, or other particulate 70 bed confined within a containing reactor liner 66. The reactor liner 66 is housed within a reactor casing 97. The casing 97 is formed by two halves that are bolted together. The liner 66 substantially covers the lower half of the reactor 64 as a separate component that is removable therefrom, and not constructed integrally therewith. When the reactor 64 is broken down into its two halves, the liner 66 may be removed and replaced if degraded by use. The liner 66 is constructed from ceramic that endures the heat produced within the reactor 64 and resists the abrasive effects of the fluidized bed 68. Between the ceramic liner 66 and the reactor casing 97 is reactor insulation 96 that resists the transfer of heat across the reactor walls.

Heated pressurized gas is initially delivered from a compressed gas source 50 through a distribution system 72 that includes a distribution ring 91 located below the sand bed 68, both when the bed 68 is settled and when active. Capped tubular fingers 92 are fluidly connected to the ring 91. Below the caps of the fingers 92, and through a wall of the fingers 92 are apertures through which the pressured gas is introduced into the bed 68. In the preferred embodiment, the fingers 92 project substantially upward. The caps prevent the particles 70 of the bed 68 from settling down into the hollow fingers 92 when there is no gas flow.

A heater 74 is provided to raise the temperature of the supplied gas for controlled periods of time. After an initial start-up time, the heated gas sufficiently heats the bed 68 so that its heating effect is no longer needed; instead, the reaction that has been induced by the heated air in the reactor 64 becomes self-perpetuating as long as conducive conditions are maintained within the reactor. When gas is supplied, the bed 68 becomes fluidized as the delivered gas bubbles up through the heavier sand particles 70. When the sand 70 has been sufficiently heated to approximately 500 degrees celsius, the biomass fuel 04 is introduced therein by depositing the biomass fuel 04 through a drop tube 90 to a location within the bed 68 adjacent to a physical agitator 76. The drop tube 90 extends from an inlet into the reactor 64 to just above the agitator 76. The pressure within the drop tube 90 is at least equal to, and is normally just greater than the pressure within the reactor 64; having the pressure within the tube 90 just greater than that of the reactor 64 prevents particles 70 of the bed 68 from invading the tube 90. The drop pipe 90 is preferably constructed from silicon carbide that is especially suited for this application because of its operating qualities in high temperatures and abrasive conditions.

The agitator 76 is a centrally located rotatable paddle. The purpose of the agitator 76 is to evenly distribute the biomass fuel 04 throughout the fluidized bed 68. The agitator 76 is constructed from metal that is not only heat tolerant, but also abrasive resistant since it is operated within the fluidized bed 68; therefor, silicon carbide is also a preferred construction material for the agitator paddle 76.

The paddle 76 is carried upon an agitator shaft 93 that connects the paddle to an agitator motor 94 outside the reactor 64. Because of the extreme heat conditions within the reactor 64, it is necessary to construct the shaft 93 from a strong material having insulative qualities so that the heat that the paddle 76 is subjected to is not communicated to the driving motor 94. Therefore, it is contemplated that the shaft 93 be constructed from partially stabilized zirconia, or similarly performing material.

Upon mixing with the heated sand 70, the biomass fuel 04 is "cracked" and gasified. That is to say, the cellulose molecules of the biomass are broken down into hydrogen, carbon monoxide, carbon dioxide, methane and small amounts of slightly heavier hydro-carbons. Solids 08 are also produced from the gasified biomass fuel 04. These solids 08 appear as ash that contains among others, sodium, potassium and silicon. This process may be considered a partial combustion because all of the constituents are not burned in their entirety.

The produced gas 06 and solids 08 rise out of the fluid bed upwardly in a mixture in which the ash particles 08 are suspended in the gas 06. At least one separator 78 must be employed to separate the combustible gas 06 from the solids 08. In the illustrated embodiment, the mixture is directed to a cyclone 80 separator that "spins" the solids 08 out of the gas 06 using centrifugal force. The ash particles 08 fall out of suspension and are collected from the cyclone 80. From the point of collection, the ash 08 is transported through a cooling screw conveyor 83 about which cooling fluid is circulated. Heat from the ash 08 is transferred to the cooling fluid that is then carried away from the system 10. The cooled ash 08 is then depressurized by an ash depressurization device 87 and transported to an ash storage container 84.

The gas 06 is further treated by a mechanical filter 82. The additional degree of cleaning provided by the filter 82 is necessary when the produced gas 06 is going to be used in such applications as fueling gas turbines. It is required that the solid particles 08 be substantially completely removed from the gas 06 because the solids 08 may cause erosion and damage to the turbine when circulated therethrough. It is contemplated that the filtering medium of the mechanical filter 82 includes among others, sintered metal and ceramic barrier.

In the illustrated embodiment, the filter is a mechanical filter 82, however it is contemplated that the gas 06 may be filtered by any suitable means that removes the remnants of ash 08 that may remain in suspension through the cyclone 80. A mechanical filter 82 is preferred because it is desired that the produced gas 06 remain dry. In one embodiment, the filters 82 are high temperature filters 82 capable of operating at temperatures exceeding 760 degrees celsius.

When a prescribed back pressure is experienced at the filter 82, it must be cleaned. In the preferred embodiment, the cleaning of the filter 82 is accomplished by introducing intermittent blasts of steam, nitrogen or other inert gas from a compressed supply 85 that causes the cake of ash, or portions thereof, collected on the filter 82 to be dislodged from the filter medium and drop for collection and transport to the ash storage container 84. The action of the inert gas is to "back wash" the filter 82 sections. In one tested embodiment, the filters 82 were rated at 1720 kPa and contain four sintered metal filters with a total of 0.23 square meters of filter area.

It should be appreciated that any suitable method and apparatus for removing the gas from the solids may be employed. Either the cyclone 80 or the mechanical filter 82 may be independently sufficient, or the two may be employed together, or in combination with other separators 78 to accomplish the effective separation of the two components. In a preferred embodiment, the mechanical filter 82 is always employed because of its thoroughness in removal of the gas from the solids.

Passed the filter 82, the gas 06 will be transported for end use. At some point downstream from the reactor vessel 64, and most likely downstream from the filters 82, the gas 06 will be depressurized down from the processing pressure that has been maintained throughout the system 10 downstream of the high pressure feed tank 30 to a pressure suitable for combustion or other end uses.

It is contemplated that any and all of the components of the process may be manually controlled by an operator or automated for independent processing. The present invention is capable of automatic operation. Various sensors, such as the temperature sensor 95 shown on the reactor 64 in FIG. 8, are located throughout the gasification system 10 that feed information about specific operations to a central processor/controller 86. Most typically, the information relates to temperature and pressure at specific locations and within specific components. The controller 86 has been programmed to initiate specific operations based on detected conditions or operator input. In the present case, operator inquiries and directions are input through a system keyboard. Furthermore, the controller 86 records data for later analysis and manipulation.

Other operations within the system 10 may also be automated or computer controlled with the controller 86. It is contemplated that the operations and interactions of the fuel feeding system may also be automated. That is to say, the batch filling process of the high pressure feed tank 30 may be automated as well as the coordination between the meter hopper 60 and tank 30, or weigh belt 56 and tank 30. The entire system may be automated and independently function based on a single user input of produced gas 06 required. From that, the biomass gasification system 10 may be computer controlled to deliver the requisite biomass fuel 04 to the reactor 64 to meet the demand.

In one embodiment of the invention, the control and data acquisition system 86 includes ABB Kent-Taylor ModCell 2000 industrial microprocessor controllers. Operator interface is via a host personal computer. The software allows realtime on-screen data plotting and historical replay of data.

These and other variations, which will be appreciated by those skilled in the art, are within the intended scope of this invention for a gasification system for producing combustible gas from biomass.

What is claimed is:

1. A biomass gasification system for producing combustible gas from biomass, said system comprising:
   a bulk biomass feeder for conveying biomass fuel to said gasification system;
   a high pressure feed tank pressurizable above atmospheric pressure into which biomass fuel is deposited and within which the internal pressure is raiseable to a processing pressure;
   a reactor for converting biomass fuel into combustible gas and solids;
   a pressurized conveyance for transporting biomass fuel from said high pressure feed tank to said reactor at the processing pressure; and
   a separator for separating the combustible gas and the solids.

2. The biomass gasification system for producing combustible gas from biomass as recited in claim 1, wherein said high pressure feed tank, said pressurized conveyance, said reactor, and said separator are connected together in open fluid communication so that the internal pressure of each is equal to said processing pressure.

3. The biomass gasification system for producing combustible gas from biomass as recited in claim 1, wherein said bulk biomass feeder further comprises:
   a conveyor belt having a delivery end from which transported biomass fuel is delivered to said gasification system for continued processing; and
   said conveyor belt having a distal end located proximate to a biomass fuel source.

4. The biomass gasification system for producing combustible gas from biomass as recited in claim 1, wherein said bulk biomass feeder further comprises:
   a screw conveyor having a delivery end from which transported biomass fuel is delivered to said gasification system for continued processing; and
   said screw conveyor having a distal end located proximate to a biomass fuel source.

5. The biomass gasification system for producing combustible gas from biomass as recited in claim 1, further comprising:
   a pneumatic conveyor for transporting biomass fuel from said bulk biomass feeder to said high pressure feed tank.

6. The biomass gasification system for producing combustible gas from biomass as recited in claim 5, further comprising:
   a vacuum fluidly connected across said high pressure feed tank;
   a vacuum conduit fluidly connected to said high pressure feed tank at one end; and
   said vacuum conduit terminating in a vacuum suction nozzle at an opposite end.

7. The biomass gasification system for producing combustible gas from biomass as recited in claim 6, wherein said vacuum suction nozzle is located proximate to biomass fuel being conveyed by said bulk biomass feeder.

8. The biomass gasification system for producing combustible gas from biomass as recited in claim 1, wherein said high pressure feed tank further comprises:
   at least one opening having a closure device for closing said opening substantially air tight.

9. The biomass gasification system for producing combustible gas from biomass as recited in claim 8, wherein said closure device is a valve.

10. The biomass gasification system for producing combustible gas from biomass as recited in claim 1, wherein said high pressure feed tank further comprises:
    an inlet connection, a discharge connection, and a vacuum connection;
    said inlet connection, said discharge connection, and said vacuum connection each being closeable so that said tank may be a substantially gas-tight container.

11. The biomass gasification system for producing combustible gas from biomass as recited in claim 10, wherein said high pressure feed tank further comprises:
    a compressed gas source fluidly connected to said high pressure feed tank for increasing the pressure therein when said high pressure feed tank is in a closed configuration.

12. The biomass gasification system for producing combustible gas from biomass as recited in claim 11, wherein said high pressure feed tank further comprises:
    said compressed gas source being supplied from compressed gas produced by a turbine generating power from produced combustible gas of said biomass gasification system.

13. The biomass gasification system for producing combustible gas from biomass as recited in claim 1, wherein said reactor for converting the biomass fuel into combustible gas and solid components is a gas-blown fluidized bed.

14. The biomass gasification system for producing combustible gas from biomass as recited in claim 13, wherein said gas-blown fluidized bed further comprises:
    a reactor liner serving as a container for said gas-blown fluidized bed;
    particulate that settles to a bottom of said reactor housing when said fluidized bed is idle;
    an initially heated gas source fluidly connected to a distribution system; said distribution system located at said bottom of said reactor for fluidizing said particulate when heated gas is delivered;
    a drop tube having an outlet terminating within said fluidized bed and proximate to an agitator located therebelow.

15. The biomass gasification system for producing combustible gas from biomass as recited in claim 14, wherein said agitator is a rotatable paddle for promoting substantially even distribution of biomass fuel throughout said fluidized bed.

16. The biomass gasification system for producing combustible gas from biomass as recited in claim 14, wherein said reactor liner is removable from said reactor housing to facilitate replacement of said liner.

17. The biomass gasification system for producing combustible gas from biomass as recited in claim 1, wherein said pressurized conveyance for transporting the biomass fuel from said high pressure feed tank to said reactor at the processing pressure comprises a variable speed screw conveyor.

18. The biomass gasification system for producing combustible gas from biomass as recited in claim 1, wherein said pressurized conveyance for transporting the biomass fuel from said high pressure feed tank to said reactor at the processing pressure comprises a variable speed weigh belt.

19. The biomass gasification system for producing combustible gas from biomass as recited in claim 1, wherein said pressurized conveyance for transporting the biomass fuel from said high pressure feed tank to said reactor at the processing pressure comprises a live bottom volumetric conveyor.

20. The biomass gasification system for producing combustible gas from biomass as recited in claim 1, wherein said separator for separating the combustible gas from the solids comprises a cyclone separator.

21. The biomass gasification system for producing combustible gas from biomass as recited in claim 1, wherein said separator for separating the combustible gas from the solids comprises a mechanical filter.

22. The biomass gasification system for producing combustible gas from biomass as recited in claim 21, further comprising:

said separator for separating the combustible gas from the solids includes a cyclone separator;

an ash cooler fluidly connected to said separator for cooling heated ash that is collected from said cyclone and said filter; and an ash storage container for retaining ash removed from said gasification system.

23. The biomass gasification system for producing combustible gas from biomass as recited in claim 22, further comprising:

an ash pressure drop device that permits the lowering of the pressure about the ash from the operating pressure of the system to the lower atmospheric pressure at which the ash will be stored.

24. The biomass gasification system for producing combustible gas from biomass as recited in claim 1, further comprising:

a controller that automates the processes of said gasification system and monitors operating conditions therein.

25. A method for gasifying biomass into combustible gas in a biomass gasification system; said method comprising:

depositing biomass fuel into a high pressure feed tank pressurizable above atmospheric pressure;

increasing the pressure within said high pressure feed tank to a processing pressure required within the gasification system;

conveying said biomass fuel under pressure from the high pressure feed tank by a variable speed conveyance assembly;

depositing said biomass fuel from said variable speed conveyance assembly into a gas-blown fluidized bed reactor;

gasifying said biomass in said reactor; and producing combustible gas from said biomass.

26. The method for gasifying biomass into combustible gas in a biomass gasification system as recited in claim 25; said method further comprising:

separating ash particulate from said produced gas by cycloning said produced gas.

27. The method for gasifying biomass into combustible gas in a biomass gasification system as recited in claim 25; said method further comprising:

separating ash particulate from said produced gas by mechanically filtering said produced gas.

* * * * *